United States Patent
Hosier et al.

(10) Patent No.: US 6,396,596 B1
(45) Date of Patent: May 28, 2002

(54) READOUT SYSTEM FOR A FULL-COLOR IMAGE INPUT SCANNER HAVING THREE LINEAR ARRAYS OF PHOTOSENSORS

(75) Inventors: Paul A. Hosier, Rochester; Scott L. Tewinkle, Ontario; Jagdish C. Tandon, Fairport; Thomas R. Beikirch, Rochester, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/563,031

(22) Filed: May 1, 2000

Related U.S. Application Data (63) Continuation of application No. 09/050,185, filed on Mar. 30, 1998.

(51) Int. Cl.[7] ............................. G06F 15/00; H04N 1/46
(52) U.S. Cl. ........................................ 358/1.9; 358/514
(58) Field of Search .................... 358/1.9, 513, 512, 358/505, 483, 814, 474, 482, 296; 250/226, 216; 347/129, 130; 382/312, 315, 318

(56) References Cited

U.S. PATENT DOCUMENTS

| | | | | |
|---|---|---|---|---|
| 4,735,671 A | * | 4/1988 | Stoffel et al. | 156/304.3 |
| 5,031,032 A | * | 7/1991 | Perregaus et al. | 358/44 |
| 5,148,268 A | | 9/1992 | Tandon et al. | 358/41 |
| 5,483,053 A | * | 1/1996 | Johnson et al. | 250/226 |
| 5,519,514 A | | 5/1996 | TeWinkle | 358/514 |
| 5,550,653 A | | 8/1996 | TeWinkle et al. | 358/514 |
| 5,691,760 A | * | 11/1997 | Hosier | 347/238 |
| 5,753,906 A | * | 5/1998 | Gennetten | 250/226 |
| 5,898,510 A | * | 4/1999 | Kaihotsu et al. | 358/509 |

* cited by examiner

Primary Examiner—Madeleine Nguyen
(74) Attorney, Agent, or Firm—R. Hutter (57) ABSTRACT

In a full-color image scanner having three parallel linear arrays of photosensors, each linear array of photosensors is sensitive to one primary color. With each readout cycle relating to a row of small areas on an original image moving past the scanner, the middle array of the three arrays of photosensors reads out its video data before the other two. This technique allows the arrays of photosensors to be spaced relatively close to each other, and in turn the close spacing of photosensors requires relatively fewer scan lines of video data to be temporarily buffered in the readout process.

7 Claims, 4 Drawing Sheets

READOUT SYSTEM FOR A FULL-COLOR IMAGE INPUT SCANNER HAVING THREE LINEAR ARRAYS OF PHOTOSENSORS

This application is a continuation of application Ser. No. 09/050,185, filed Mar. 30, 1998.

FIELD OF THE INVENTION

The present invention relates to image sensor arrays having multiple rows of photosensors, each row of photosensors being sensitive to a particular primary color. Such image sensor arrays are used, for example, for full-color scanning of hard-copy original images.

BACKGROUND OF THE INVENTION

Image sensor arrays typically comprise a linear array of photodiodes which raster scan an image-bearing document and convert to the microscopic image area viewed by each photodiode to image signal charges. Following an integration period, the image signals are amplified and transferred to a common output line or bus through successively actuating multiplexing transistors.

U.S. Pat. No. 5,148,268 discloses a typical arrangement of a full-color image sensor array. Separate linear arrays of photosensors are arranged in parallel on a single bar, with the photosensors in each linear array being provided with a filter thereon of one primary color. The bar is caused to move relative to an original image in a scan direction which is generally perpendicular to the direction of the arrays. As the sensor bar moves along the original image, each portion of the area of the original image is exposed to each of the linear arrays of photosensors in sequence. As each array of photosensors moves past a particular small area in the original image, signals according to the different primary color separations of that area are output by one of the photosensors in each array. In this way three separate sets of signals, each relating to one primary color, are produced by the linear arrays of photosensors.

An important parameter in the design of an image sensor array is the resolution of the array, which will of course affect the quality of image signal based on an original image. One type of resolution is dictated by the physical configuration of the individual photosensors along the array: the higher the number of individual photosensors within a given unit of length along the array, the higher the possible resolution of data that may be output by the array. This "fast scan" or x-direction resolution is of course fixed by the size and spacing of the photosensors in the array.

Another type of resolution associated with an array is the "slow-scan," or y-direction, resolution, which is the resolution of the image along the direction perpendicular to the direction of the array, which would be the direction of an original image moving relative to the array. In contrast to the x-dimension resolution, which is fixed by the physical characteristics of the array, the y-direction resolution is determined by the speed of an original image relative to the array, coupled with the integration times of individual photosensors. If the original image is moving relative to the array at a constant velocity, and the photosensor is operating at a high speed, each integration time of the photosensor will cause exposure to a relatively small area on the original image; if the integration time is longer, with each integration time an individual photosensor will be "looking at" a relatively larger area of the original image. In brief, the shorter the integration time of an individual photosensor in the array, the higher the y-direction resolution of the array.

As will be described in detail below, a technical complication may result where the desired y-direction resolution, which is related to the integration times in an array, is different from the inherent x-direction resolution of the array. For example, one possible design for a full-page-width full-color array provides, by virtue of its photosensor size, a fixed 400 SPI resolution in the x-dimension, but can provide, by virtue of the operational speed of the photosensors, a 600 SPI resolution in the y-direction. The present invention is directed to physical and operating parameters of a full-color scanning array which overcomes certain design requirements caused by high y-direction resolution.

DESCRIPTION OF THE PRIOR ART

U.S. Pat. No. 5,148,268, referenced above, and U.S. Pat. No. 5,543,838 disclose multiplexing systems for reading out signals from a full-color image sensor bar having three linear arrays of photosensors, each linear array having a filter thereon for one primary color.

U.S. Pat. No. 5,519,514 discloses a full-color sensor bar having three parallel arrays of photosensors, each array being sensitive to a different primary color. With each scan cycle as the bar is moved relative an original image, the exposure of the photosensors is precisely timed so that the optical "center of gravity" for each exposed area in the original image is superimposed for all of the primary color photosensors.

U.S. Pat. No. 5,550,653 discloses a full-color input scanner, which is operated in a mode adapted for efficient scanning of documents with simple color relations. Three linear arrays of photosensors, each linear array corresponding to one primary color, are moved relative to the original image. One linear array of photosensors operates on a full cycle and converts every single scan line of the original image into digital signals. Simultaneously, the other primary-color-sensitive linear arrays operate on half cycles and record only signals corresponding to an evenly-distributed subset of small areas of the original image.

SUMMARY OF THE INVENTION

According to one aspect of the present invention, there is provided a method of operating an image sensor for deriving image data from an original image on a sheet. There is disposed on the image sensor a first linear array of photosensors, a second linear array of photosensors, and a third linear array of photosensors, the second linear array of photosensors and the third linear array of photosensors being parallel to the first linear array of photosensors. The second linear array of photosensors is disposed between the first linear array of photosensors and the third linear array of photosensors. The sheet is moved at a predetermined velocity relative to the image sensor, in a process direction perpendicular to the first linear array of photosensors. As the sheet moves relative to the image sensor, image data from the first linear array of photosensors, the second linear array of photosensors, and the third linear array of photosensors is periodically recorded, whereby for a small area on the sheet, the image data related to the small area is recorded by the second linear array of photosensors before the image data related to the small area is recorded by the first linear array of photosensors or the third linear array of photosensors.

According to another aspect of the present invention, there is provided an image sensor for deriving image data from an original image on a sheet. A first linear array of photosensors and a second linear array of photosensors is disposed parallel to the first linear array of photosensors, each photosensor in the first linear array of photosensors and the second linear array of photosensors having a predetermined length along a process direction perpendicular to the first linear array of photosensors. A center of a photosensor in the first linear array is spaced from a center of a photosensor in the second linear array along the process direction by 14/9 a length of a photosensor in the first linear array along the process direction.

According to another aspect of the present invention, there is provided an image sensor for deriving image data from an original image on a sheet. A first linear array of photosensors and a second linear array of photosensors is disposed parallel to the first linear array of photosensors, each photosensor in the first linear array of photosensors and the second linear array of photosensors having a predetermined length along a process direction perpendicular to the first linear array of photosensors. A center of a photosensor in the first linear array is spaced from a center of a photosensor in the second linear array along the process direction by 10/9 a length of a photosensor in the first linear array along the process direction.

DETAILED DESCRIPTION OF THE INVENTION

For purposes of the description and claims, the following terms shall be here defined:

Scan line: the complete color data from a single linear array of photosensors (such as for one primary color sensitive linear array of photosensors) for a given integration or exposure period, or the data collected in the fast-scan or x-direction.

Scan line pitch: the distance a photosensor moves with respect to the original image between the recording of scan lines in the slow-scan or y-direction.

Pixel pitch: the distance between the center of one color pixel (effective photosensitive area of a photosensor) to the center of the next color pixel opening in the y-direction.

Pixel size: the length of a photosensor along the y-direction.

Figure 1:
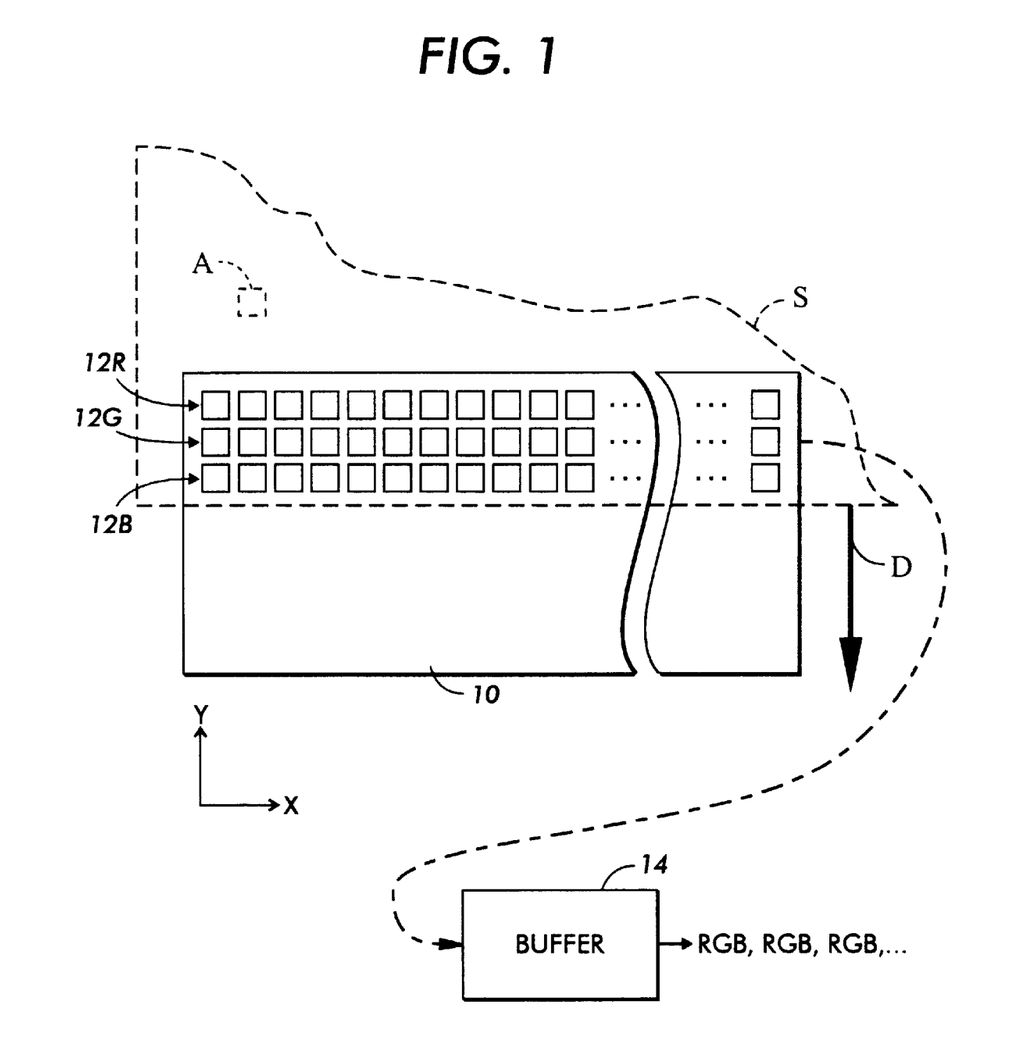
FIG. 1 is a diagram showing the relationship between a full-color image sensor chip recording an image on a sheet passing relative thereto, and the resulting video data being sent to a buffer.

FIG. 1 is a diagram showing the relationship of an example portion of a full-color photosensor array recording digital data based on an original hard copy image on a sheet. A chip indicated as 10 represents all or part of a full-color sensor bar; as in known in the art, such a sensor bar may include a single chip, which is exposible to a page-width image through reduction optics, or could be one chip in a butted array of similar chips in a full-page-width array. The chip 10 includes thereon three rows of photosensors, here indicated as 12R (Red), 12G (Green), and 12B (Blue). As is familiar in the art, each row of photosensors is made sensitive to one primary color, such as by including a translucent filter thereon (not shown).

An original image which is desired to be converted into digital data is borne on a sheet, an outline of a portion of which is shown in phantom in FIG. 1 as S. As is familiar in the art of hard-copy scanning, sheet S is moved at a predetermined constant velocity in a process direction, here indicated as D, which is perpendicular to the direction of extension of each row of photosensors 12R, 12G, and 12B. In this way, a particular small area on sheet S, such as the example small area indicated as A in FIG. 1, is sequentially exposed to one photosensor for each primary color in the array. As the small area A of the original image moves past each primary-color-sensitive photosensor, its color properties are recorded for each primary color in sequence. A row of small areas A must pass over each of the three linear arrays of photosensors 12R, 12G, and 12B, for the color properties of the row of small areas to be recorded by the photosensors.

In a practical embodiment of a full-color array, there is typically a single output line or equivalent thereof for each individual row, 12R, 12G, 12B, of photosensors, and at a particular time, there will be output from chip 10 relatively long series of video signals, corresponding to, for example, all of the red signals in a scan line, then all the green signals in the scan line, and then all the blue signals. However, for the video signals to be sent on to image-processing circuitry, the image data should be arranged on a pixel-by-pixel basis, so that the primary color signals RGB for every individual small area A are together: thus, the sets of separate red signals, green signals, and blue signals for every scan line must be temporarily stored and then rearranged on a pixel-by-pixel basis. Thus, there is shown in FIG. 1 a buffer 14, which accepts data relating to complete scan lines for rows 12R, 12G, and 12B, temporarily stores the image data corresponding to these scan lines, and then reads out the data as individual RGB signals, one set of signals for each pixel-size small area such as A.

The buffer 14 must hold the video data for a particular scan line until all of the primary color data for a scan line is collected. For instance, if data is being read out in the order red scan line, green scan line, blue scan line, the buffer 14 must hold the red video data and green video data for a scan line until it finally receives the blue video data for the scan line (i.e., only after the row of small areas A of the original image in question is moved past the blue photosensors 12B, and the resulting blue video signals read out of chip 10): only then would the full three-color signals for the scan line be complete for the pixels in the row and the data be able to be read out of the buffer 14 and sent on to image-processing circuitry. Generally it is desirable to minimize the amount of temporary storage of video signals in buffer 14, as the buffer is a memory which is a manufacturing expense, and the buffering step can delay the response of the chip 10 and the entire scanning system.

Figure 2:
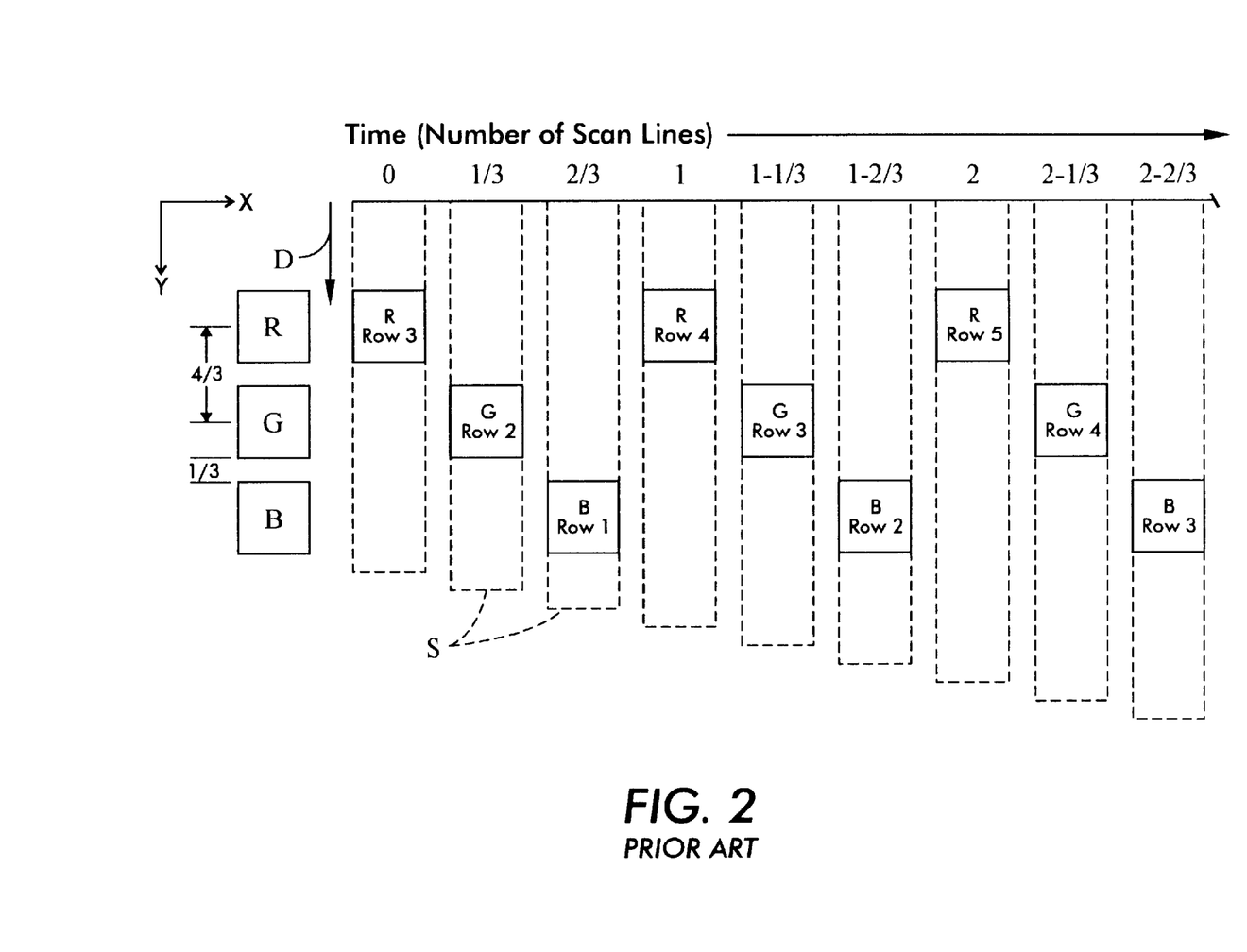
FIG. 2 shows the relationship of recording small areas on a sheet with three primary-color-sensitive photosensors, according to a method known in the prior art.

FIG. 2 is a diagram which shows the space-time relationship of primary-color-sensitive photosensors in a basic case known in the prior art, where the x-direction and y-direction resolutions are intended to be equal. On the left of the diagram in FIG. 2 are shown a red, green, and blue photosensor. A portion of a sheet S, such as shown by the dotted lines on the right of the Figure, show the location of an individual small areas such as A in FIG. 1 relative to the photosensors as the sheet moves in a direction D over time, in sequence from left to right. In this particular embodiment, a portion of every cycle of reading out a scan line of video signals from the various rows of photosensors is required for transfer of the resulting signals on a video line out of the chip (for a fuller explanation of readout systems, particularly in a CMOS-type image scanner, reference can be made to the patents referenced above). In order to take into account this necessary portion of the cycle for readout of signals from each row of photosensors, there can be provided between centers of adjacent photosensors in the y-direction an additional 1/3 pitch: as can be seen in FIG. 2, the distance between the centers of, for example, the R and G photosensors is 4/3 the length of each photosensor in the y-direction. In this 4/3, 3/3 of the pitch is the length of a photosensor itself, and the additional 1/3 represents spacing which, when the sheet S moves in constant velocity D relative to the photosensors, allows the necessary one-third duty cycle for readout of the video data for each scan line.

With reference to the right hand portion of FIG. 2, it will be noted that as the original hard copy image moves through direction D relative to the photosensors, a number of scan lines must be recorded by the photosensors before all of the color separations for a particular small area are recorded. Thus, as mentioned above, at least two scan lines of data must be stored temporarily until the final color is ready in the third storage line. Generally, because of the extra 1/3 pitch of space between the rows of photosensors, in this embodiment there must in fact be stored three lines of scan line data in buffer 14.

In this basic example of FIG. 2, and with reference to the terms defined above, the spacing of primary-color photosensors is 4/3 of a scan line pitch; that is, 4/3 the distance the sheet S moves in direction D between readout of scanline data from a row of photosensors for a particular color. Significantly, the scan line pitch is determined by the operating speed of the scanner: if the scan line data were read out at a faster rate with the motion of the sheet held constant, the scan line pitch would be shorter, because the sheet will have traveled a shorter distance between recording steps. In the FIG. 2 example, because the x-direction resolution is intended to be equal to the y-direction resolution, the scan line pitch happens to be equal to the pixel size, as those terms are defined above. A practical complication results, however, if the y-direction resolution is desired to be higher than the x-direction resolution, such as when an array having photosensors sized for 400 spi resolution is run at a high scan rate to achieve 600 spi resolution in the y-direction.

Figure 3:
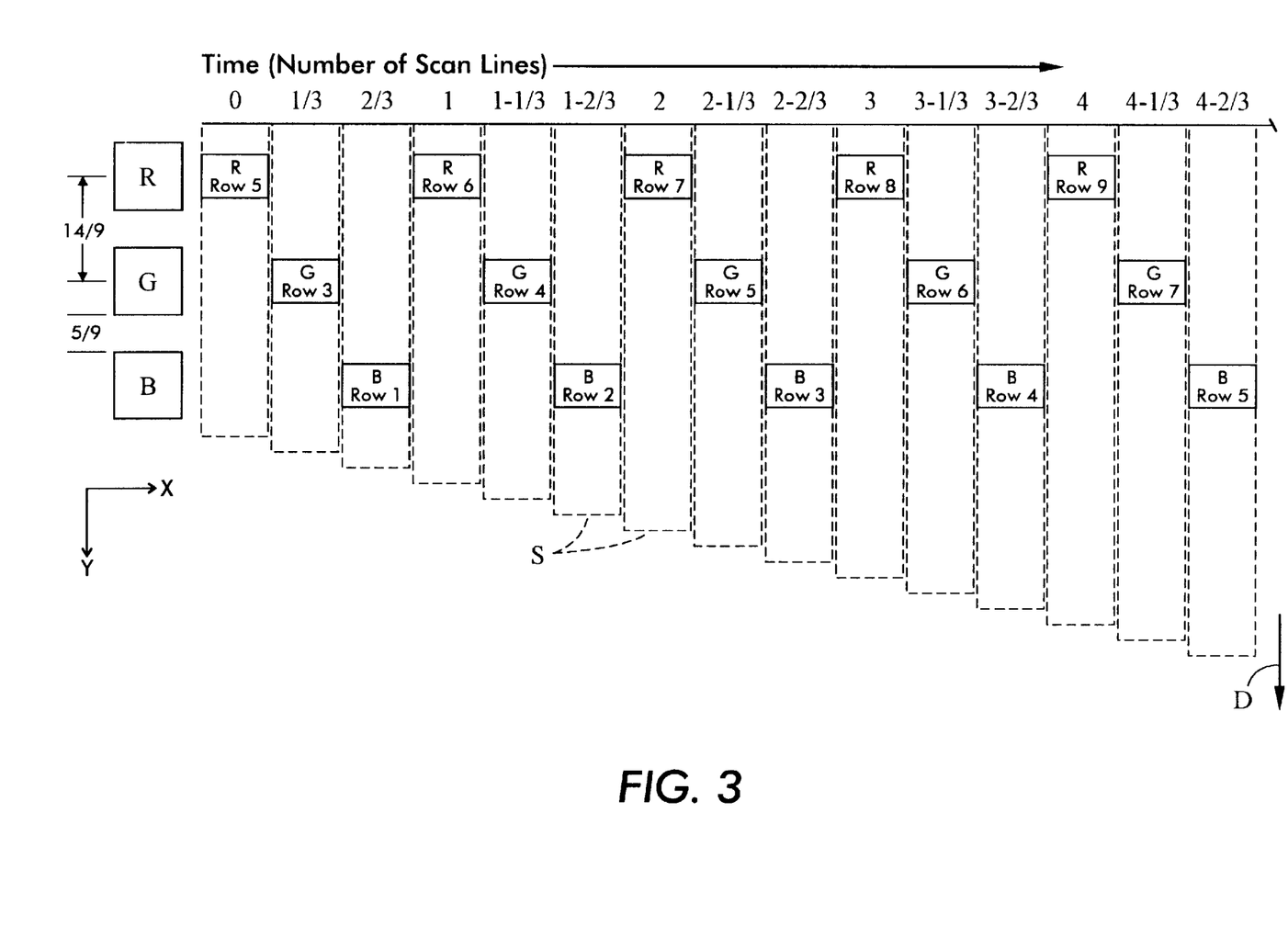
FIG. 3 is a diagram similar to that of FIG. 2, showing the recording of small areas on an original image in a manner having a relatively high resolution in the slow-scan direction according to one embodiment of the present invention.

FIG. 3 is a diagram analogous to that of FIG. 2, showing the situation of recording various small areas on an original image in a situation where the y-direction resolution of the scanner is intended to be greater than the x-direction resolution. Because of the higher readout rate in the y-direction, the integration time of each individual photosensor is made smaller in the y-direction, and thus each individual photosensor "looks at" an area on the original image which is smaller in the y-direction: compare, for example, the dimensions of the small areas in FIG. 3, which are shorter in the y-direction, to the relatively square small areas in FIG. 2. With reference to the definitions given above, whereas the pixel size in a 400 spi image scanner is 63.5 micrometers in the y-direction, because in the FIG. 3 example the original image moves a shorter distance per scan line interval, the scan line pitch for the FIG. 3 example is only 42.5 micrometers. (Also, because it is desirable to have generally square photosensors, the width of each photosensor in the x-direction should be close to 63.5 micrometers, for a 400 spi resolution in the x-direction.)

In the FIG. 3 example, to provide the necessary center-to-center-spacing of 4/3 times 42.5 micrometers (the scan line pitch) would not be possible because, in order to facilitate the 4/3 spacing with 400 SPI sensors operating at 600 SPI, the 400 SPI sensors would have to overlap in the y-direction. In the FIG. 3 embodiment, however, this necessary spacing is accommodated by adding the equivalent of a whole extra scan line pitch to the 4/3 spacing, for a total spacing between centers of adjacent primary-color photosensors of 1+4/3 scan line pitches, or 7/3 scan line pitches. Thus, according to one aspect of the present invention, for an image scanning array having a resolution of 400 SPI in the fast scan direction and an operating resolution of 600 SPI in the slow-scan direction (or a ratio of 1.5), the center-to-center spacing between adjacent photosensors in the array is 7/3 times the distance the sensor moves with respect to the original image between scan line readouts in the slow scan direction. With regard to border-to-border spacing of adjacent photosensors in this embodiment, as shown, the distance between adjacent edges of such photosensors is 5/9 the length of each photosensor in the y-direction (making a center-to-center spacing of 14/9 the length of each photosensor in the y-direction), or 5/6 the scan line pitch.

One disadvantage of having relatively large spacing between adjacent rows of photosensors is that temporary storage of more scan line data will be required in data buffer 14. In the example of FIG. 3, it would be necessary to retain video data for five scan lines at a time, until all of the primary color data for a particular small area is accumulated. Once again, this takes into account not only the time required for a particular small area to pass by a photosensor for each primary color (because the photosensors are farther apart, one will have to wait longer for an area to be "looked at" by every photosensor), but also for the video data for each primary color to be read out into the data buffer 14. It will be apparent that further whole pixel pitches could be added to the spacing, such as for a center-to-center spacing of 10/3 or 13/3, etc., but then even more storage of data would be needed in buffer 14. It would be more desirable to have a system which did not require an unusually large spacing between adjacent rows of photosensors, so that, among other reasons, not so many lines of video data would have to be retained in the data buffer 14.

Figure 4:
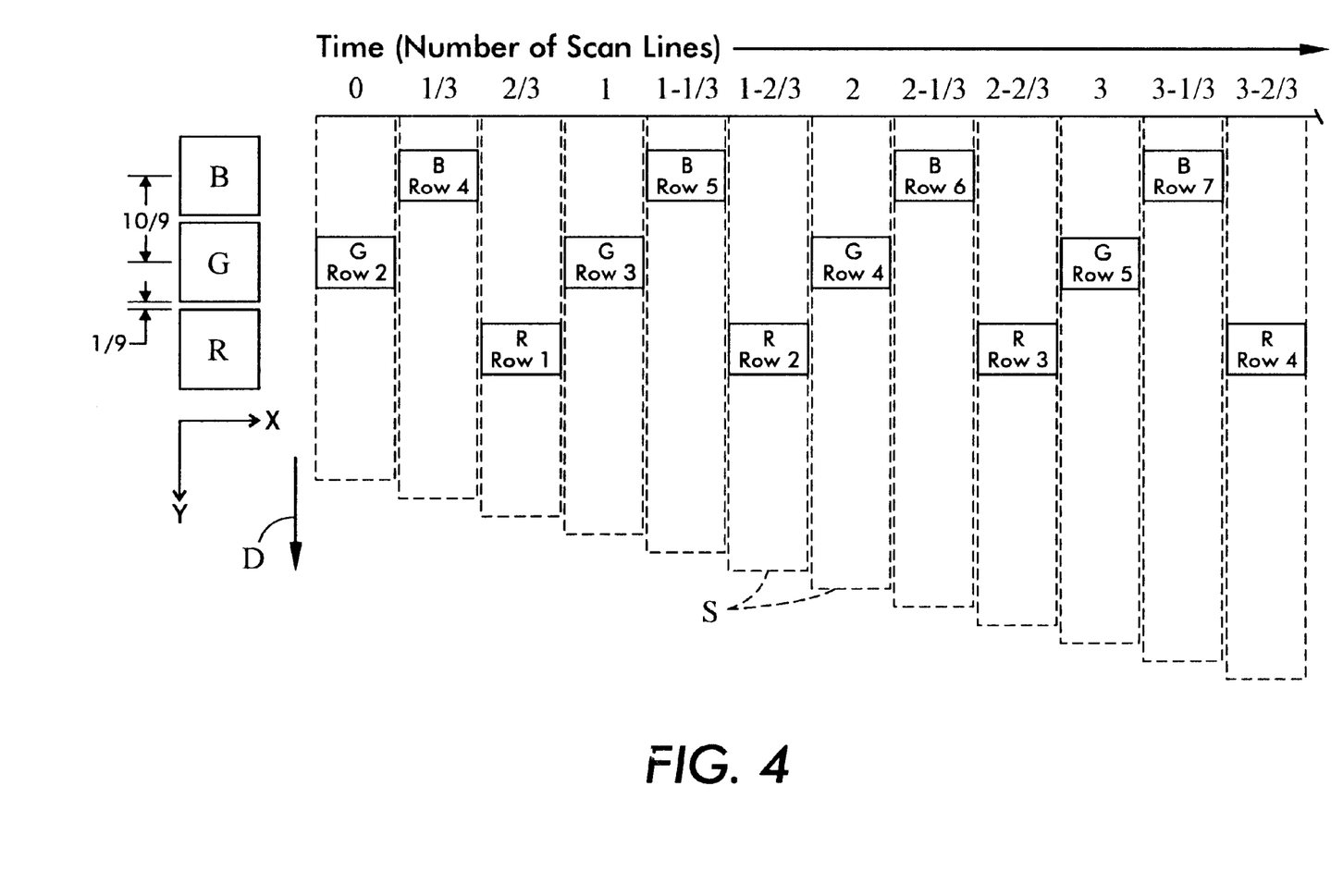
FIG. 4 is a diagram similar to that of FIG. 2, showing the recording of small areas on an original image in a manner having a relatively high resolution in the slow-scan direction according to another embodiment of the present invention.

FIG. 4 shows a configuration of photosensors, combined with a readout routine, according to another aspect of the present invention. Once again, as in the FIG. 3 example, photosensors having the pixel size suitable for 400 SPI resolution are operated at a speed consistent with a 600 SPI resolution in the y-direction. However, according to this aspect of the present invention, the center-to-center spacing of adjacent photosensors is only 5/3 the scan line pitch, as opposed to the 7/3 times the scan line pitch of the FIG. 3 example. This closer spacing of adjacent rows of photosensors not only reduces the amount of "real estate" required on a chip such as 10 for the photosensors, but also necessitates fewer scan lines of temporary data storage in data buffer 14: in a practical embodiment, the scheme of FIG. 4 requires temporary storage of only four lines of video data, as opposed to the five lines in the FIG. 3 embodiment. With regard to border-to-border spacing of adjacent photosensors in this embodiment, as shown, the distance between adjacent edges of such photosensors is 1/9 the length of each photosensor in the y-direction (thus making a center-to-center spacing of 10/9 the length of each photosensor in the y-direction), or 1/6 the scan line pitch.

This closer spacing of adjacent rows of photosensors in the FIG. 4 embodiment is facilitated by a unique readout routine: according to the present invention, for every row of small areas on a sheet S moving relative to the photosensors, in sequence the green scan line of video data is read out first, then followed by the blue and red video data for the same small areas in the row. More generally, if there is provided on a scanning array three parallel linear arrays of photosensors, and video data from one particular linear array can be recorded at a predetermined time, according to the present invention for every small area on an original image being scanned, the data from the middle linear array is recorded prior to recording image data from either of the other linear arrays of photosensors. The configuration of recording small areas as shown in the sequence of FIG. 4 is what results from this technique.

According to this scheme, the rows of photosensors are placed 5/3 scan line pitches apart, and the readout order of video scan lines is G,B,R or G,R,B. If the G, B, R order is used, the original image must be scanned in the opposite orientation to the direction shown in the Figure.

As shown in the Figure, the green photosensor is read out first and the video data from row 2 of small areas on the original image is read out. By the time the blue video data is read out, the document has moved 1/3 of a 600 SPI scan line and reads out row 4 of small areas on the original (row 2+1 2/3 pitch+1/3 scan line movement). By the time the red video data is read out, the original image has moved 2/3 scan line and is now reading out row 1 of small areas in the image document (row 2−1 2/3 pitch+2/3 scan line movement). Since the data from one scan line contains colors from four different physical scan lines of the original image, it can be seen from the Figure that only four lines of video data are required to assemble colinear RGB pixel data for a row of small areas on the original image.

With specific regard to the embodiment of FIG. 4 it should be noted that the resulting pattern of recording of different small areas (i.e., within a row of small areas within a column of small areas which move in sequence over a single set of R, G, B photosensors 12) relate to the read out of a scan line of image data from a large set of photosensors. Once again, in a typical commercial design of a CMOS-based image sensor chip, there exists in each linear array of photosensors 248 photosensors which output a scan line of video image data with every readout. Thus, with reference to the "time line" at the bottom of FIG. 4, between the reading out of 0 and 1/3 scan lines individual image signals from all 248 green photosensors in the green linear array are read out, and from a 1/3 to 2/3 scan line time period, all of the blue photosensors are read out, and finally from 2/3 to 1 full scan line of time line, all of the red photosensors are read out. In the most common embodiment of a CMOS-based image sensor chip, such as described in U.S. Pat. No. 5,148,268 referenced above, the read out period for an individual single-color linear array of photosensors immediately follows the integration time (i.e., the recording step) of the linear array of photosensors, although it is possible that, in alternate designs of image sensors, the image sensor data may be held for some period of time between integration time and readout.

Nonetheless, consistent with FIG. 4, with the passage of time, it can be seen, for each triplet of R, G, B photosensors, the middle green photosensor records first in time, immediately reads out its image data (along with the image data of the other 247 active green photosensors in the linear array), then the blue photosensors record and read out, and then finally the red photosensors record and read out. This sequence has the effect of recording for the middle linear array of photosensors with regard to each small area on the original image, as is claimed below. In this embodiment, the buffering of scan line data on a continuous basis in four storage lines of data is as follows:

Data Stream out of Sensor Chip ($Color_{column\ x,\ row\ y}$)
Storage Line 1: $G_{1,2}, G_{2,2}, G_{3,2}, \ldots, B_{1,4}, B_{2,4}, B_{3,4}, \ldots, R_{1,1}, R_{2,1}, R_{3,1}, \ldots$
Storage Line 2: $G_{1,3}, G_{2,3}, G_{3,3}, \ldots, B_{1,5}, B_{2,5}, B_{3,5}, \ldots, R_{1,2}, R_{2,2}, R_{3,2}, \ldots$
Storage Line 3: $G_{1,4}, G_{2,4}, G_{3,4}, \ldots, B_{1,6}, B_{2,6}, B_{3,6}, \ldots, R_{1,3}, R_{2,3}, R_{3,3}, \ldots$
Storage Line 4: $G_{1,5}, G_{2,5}, G_{3,5}, \ldots, B_{1,7}, B_{2,7}, B_{3,7}, \ldots, R_{1,4}, R_{2,4}, R_{3,4}, \ldots$ As can be seen in the above chart, four lines of image data are required before the G, B, and R image data for a particular column x, row y on the original image is accumulated: See for example, datum $B_{1,4}$ at the "front"(or from the first line) of the buffer and datum $R_{1,4}$ at the "back"(or from the last line) of the buffer.

In summary, the advantage of the configuration of the FIG. 4 embodiment, wherein the middle linear array is read out first for every row of small areas in the original image, is that the parallel rows of photosensors, each for one primary color, can be spaced relatively close to each other, 5/3 scan line pitches, versus 7/3 scan line pitches in the FIG. 3 embodiment. This closer spacing not only saves a fairly significant amount of space on a chip including the scanning array, but, by virtue of the closer photosensor rows being more compressed in time in a scanning process, fewer scan lines of video data need be temporarily retained to assemble all of the primary color data for a row of pixels in the original image. Once again, in a practical embodiment, the configuration of FIG. 4 requires the temporary buffering of four scan lines of video data, while the less-closely-spaced photosensor rows of the FIG. 3 embodiment require at least five scan lines of video data to be temporarily buffered.

While the invention has been described with reference to the structure disclosed, it is not confined to the details set forth, but is intended to cover such modifications or changes as may come within the scope of the following claims.

What is claimed is:

1. A method of operating an image sensor for deriving image data from an original image on a sheet, comprising the steps of:

providing on the image sensor a first linear array of photosensors, a second linear array of photosensors, and a third linear array of photosensors, the second linear array of photosensors and the third linear array of photosensors being parallel to the first linear array of photosensors, the second linear array of photosensors being disposed between the first linear array of photosensors and the third linear array of photosensors;

causing the sheet to move at a predetermined velocity relative to the image sensor, in a process direction perpendicular to the first linear array of photosensors;

as the sheet moves relative to the image sensor, periodically recording image data from the first linear array of photosensors, the second linear array of photosensors, and the third linear array of photosensors, whereby for a small area on the sheet, the image data related to the small area is recorded by the second linear array of photosensors before the image data related to the small area is recorded by the first linear array of photosensors and the third linear array of photosensors.

2. The method of claim 1, a center of a photosensor in the first linear array being spaced from a center of a photosensor in the second linear array along the process direction by 5/3 times a scan line pitch.

3. The method of claim 1, the length of a photosensor in the first linear array along the process direction being greater than one scan line pitch.

4. The method of claim 1, the length of a photosensor in the first linear array along a direction perpendicular to the process direction being greater than one scan line pitch.

5. The method of claim 1, a distance between one edge of a photosensor in the first linear array and an adjacent edge of a photosensor in the second linear array being 1/9 a length of a photosensor in the first linear array along, the process direction.

6. The method of claim 1, a distance between one edge of a photosensor in the first linear array and an adjacent edge of a photosensor in the second linear array being 1/6 of a scan line pitch.

7. The method of claim 1, the first linear array of photosensors being sensitive to a first color and the second linear array of photosensors being sensitive to a second color different from the first color.

* * * * *

UNITED STATES PATENT AND TRADEMARK OFFICE
CERTIFICATE OF CORRECTION

PATENT NO. : 6,396,596 B1
DATED : May 28, 2002
INVENTOR(S) : Ribas-Corbera et al.

It is certified that error appears in the above-identified patent and that said Letters Patent is hereby corrected as shown below:

Column 4,
Line 1, "DO" should read -- Di --.
Line 10, "Di" should read -- Di --.
Line 12, "$\tau i2$" should read -- $\sigma i2$ --.
Line 32, "Th simpler" should read -- The simpler --.
Line 58, "cl" should read -- $\sigma i$ --.

Column 5,
Line 30, "Qi'=$\sqrt{12}$ $\sigma i$" should read -- Qi'=$\sqrt{12}$ $\sigma i$ --.

Column 8,
Line 12, "mi-th" should read -- mi-th --.
Line 60, "$\sigma 5, \sigma 2, \sigma 3$" should read -- $\sigma 1, \sigma 2, \sigma 3$ --.

Column 9,
Line 10, "A" should read -- $\Delta$ --.

Signed and Sealed this

Nineteenth Day of November, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,396,596 B1 Page 1 of 1
DATED : May 28, 2002
INVENTOR(S) : Paul A. Hosier et al.

It is certified that error appears in the above-identified patent and that said Letters Patent is hereby corrected as shown below:

This certificate supersedes Certificate of Correction issued November 19, 2002, the number was erroneously mentioned and should be vacated since no Certificate of Correction was granted.

Signed and Sealed this

Twenty-second Day of April, 2003

JAMES E. ROGAN
*Director of the United States Patent and Trademark Office*